United States Patent
Suzuki

(10) Patent No.: US 10,140,445 B2
(45) Date of Patent: Nov. 27, 2018

(54) INFORMATION PROCESSING APPARATUS AND INFORMATION PROCESSING METHOD

(71) Applicant: SONY INTERACTIVE ENTERTAINMENT INC., Tokyo (JP)

(72) Inventor: Kosuke Suzuki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/102,641

(22) PCT Filed: Jun. 19, 2014

(86) PCT No.: PCT/JP2014/003309
§ 371 (c)(1),
(2) Date: Jun. 8, 2016

(87) PCT Pub. No.: WO2015/097927
PCT Pub. Date: Jul. 2, 2015

(65) Prior Publication Data
US 2016/0371482 A1    Dec. 22, 2016

(30) Foreign Application Priority Data
Dec. 27, 2013  (JP) .................................. 2013-273214

(51) Int. Cl.
*G06F 21/45* (2013.01)
*G06F 21/31* (2013.01)
(Continued)

(52) U.S. Cl.
CPC .............. *G06F 21/45* (2013.01); *G06F 21/31* (2013.01); *G06F 21/41* (2013.01); *H04L 63/083* (2013.01); *G06Q 20/1085* (2013.01)

(58) Field of Classification Search
CPC ........ G06F 21/30; G06F 21/31; G06F 21/305; G06F 21/45; G06F 21/41; H04L 63/08;
(Continued)

(56) References Cited

U.S. PATENT DOCUMENTS

| | | | |
|---|---|---|---|
| 6,760,844 B1 | 7/2004 | McCarthy et al. | |
| 2005/0090235 A1* | 4/2005 | Vermola ................ | H04H 20/57 455/414.3 |

(Continued)

FOREIGN PATENT DOCUMENTS

| | | |
|---|---|---|
| JP | 62-177664 A | 8/1987 |
| JP | 5-346902 A | 12/1993 |

(Continued)

OTHER PUBLICATIONS

International Preliminary Report on Patentability and Written Opinion of the International Searching Authority dated Jul. 7, 2016 from corresponding Application No. PCT/JP2014/003309.

(Continued)

*Primary Examiner* — Ayoub Alata
(74) *Attorney, Agent, or Firm* — Katten Muchin Rosenman LLP

(57) ABSTRACT

In an information processing apparatus 100, a password input block 20 accepts a password for use in user authentification. An authentification block 40 executes user authentification on the basis of an authentification ID and the password accepted by the password input block 20. A service provision block 80, if the user authentification by the authentification block 40 is successful, provides a service to a user concerned. The service provision block 80 provides a service corresponding to the password accepted by the password input block 20.

6 Claims, 9 Drawing Sheets

(51) Int. Cl.
  *H04L 29/06* (2006.01)
  *G06F 21/41* (2013.01)
  *G06Q 20/10* (2012.01)

(58) Field of Classification Search
  CPC . H04L 63/083; G06Q 20/108; G06Q 20/1085
  See application file for complete search history.

(56) References Cited

U.S. PATENT DOCUMENTS

| | | | |
|---|---|---|---|
| 2006/0053298 A1* | 3/2006 | Ingerman | G06F 21/34 713/182 |
| 2006/0071066 A1* | 4/2006 | Vanzini | G06F 21/34 235/380 |
| 2007/0174909 A1* | 7/2007 | Burchett | G06F 21/602 726/18 |
| 2012/0011564 A1* | 1/2012 | Osborn | G06F 21/36 726/2 |
| 2014/0150117 A1* | 5/2014 | Yamahara | G06F 21/31 726/28 |
| 2014/0317724 A1* | 10/2014 | Hicks | G06F 21/36 726/19 |

FOREIGN PATENT DOCUMENTS

| | | |
|---|---|---|
| JP | 2002-358418 A | 12/2002 |
| JP | 2006-119936 A | 5/2006 |
| JP | 2007-128259 A | 5/2007 |
| JP | 2011-59782 | 3/2011 |
| JP | 2011-191850 A | 9/2011 |
| JP | 2012-138047 A | 7/2012 |
| JP | 2012-252425 A | 12/2012 |

OTHER PUBLICATIONS

International Search Report dated Sep. 22, 2014, from the corresponding PCT/JP2014/003309.
Notification of Reason of Refusal dated Oct. 25, 2016, from the corresponding Japanese Patent Application No. 2013-273214.

* cited by examiner

FIG.1
(a) 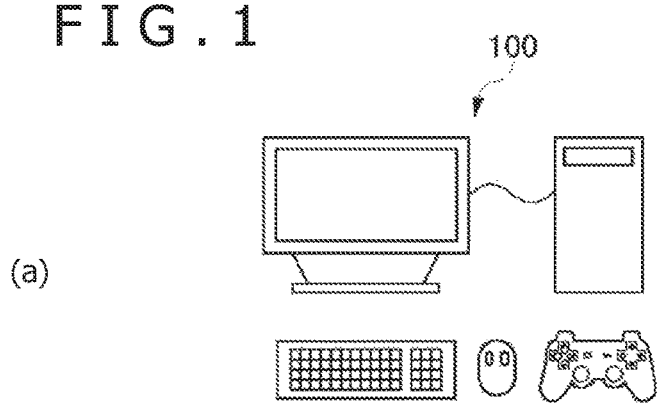
(b) 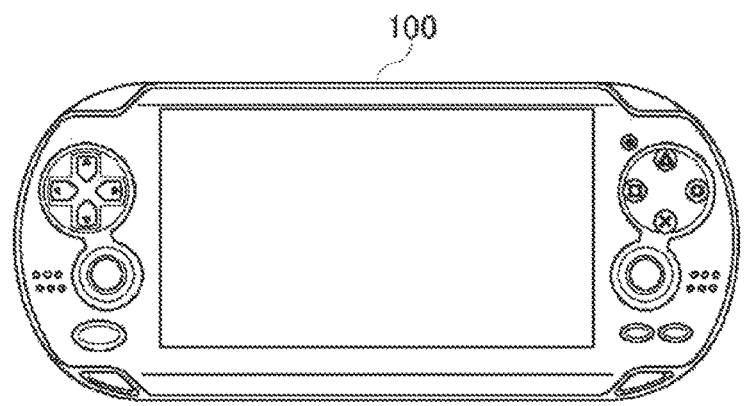
(c) 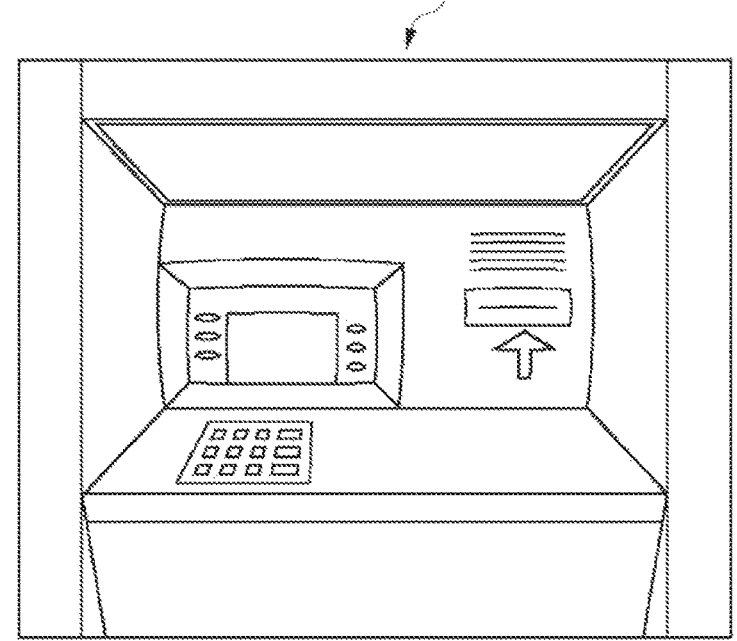

F I G. 3
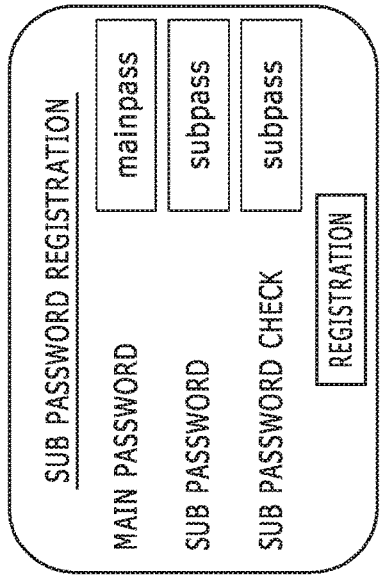
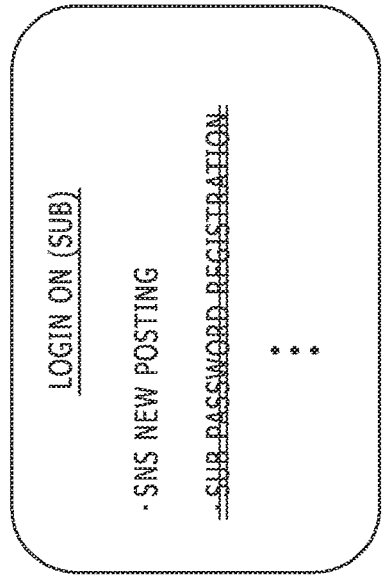
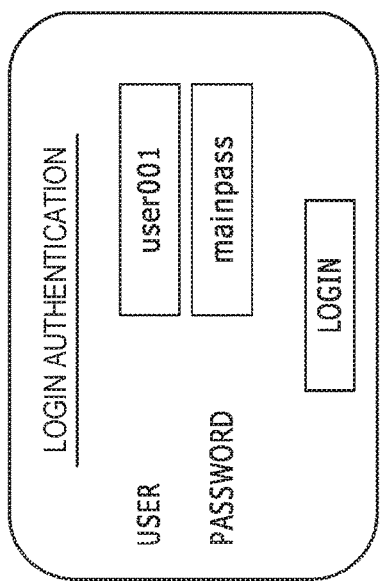
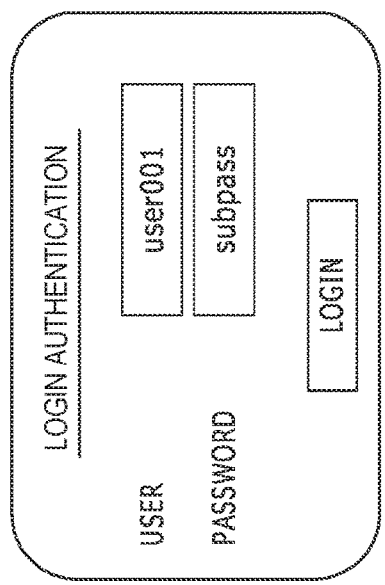

FIG. 5

AUTHORITY SETTING

AUTHORITIES OF ALL SUB PASSWORDS ASSOCIATED WITH THIS USER ARE SET.

| AUTHORITY TYPE | NEW POSTING | RECEIVE BOX | SUB PASSWORD REGISTRATION | BACKGROUND COLOR |
|---|---|---|---|---|
| NORMAL | ☑ | ☐ | ☐ | ▷ |
| ADMINISTRATOR | ☑ | ☑ | ☑ | ▷ |

| SUB PASSWORD | |
|---|---|
| subpass | ADMINISTRATOR ▷ |
| subpass1 | NORMAL ▷ |
| subpass2 | NORMAL ▷ |
| subpass3 | NORMAL ▷ |

CHANGE SUB PASSWORDS

CURRENT PASSWORD  [subpass]
NEW PASSWORD  [sub_pass]
NEW PASSWORD CHECK  [sub_pass]

[CHANGE]

(b)

SUB PASSWORD REGISTRATION

CHANGE TO "sub_pass-abc" SUFFIXED WITH "-abc."

[CHECK]

(c)

CHANGE SUB PASSWORDS

CURRENT PASSWORD  [subpass]
NEW PASSWORD  [sub_pass] + ☆ ▷
NEW PASSWORD CHECK  [sub_pass] + ☆ ▷

[CHANGE]

(d)

CHANGE SUB PASSWORDS                     CHARACTER COLOR

CURRENT PASSWORD  [subpass]
NEW PASSWORD  [sub_pass]                 ▷
NEW PASSWORD CHECK  [sub_pass]           ▷

[CHANGE]

FIG. 7

| AUTHENTICATION ID | BASE PASSWORD | ADDITIONAL INFORMATION | LOGIN AUDIO | AUTHORITY/SERVICE |
|---|---|---|---|---|
| user001 | mainpass | -abc | NONE | ADMINISTRATOR |
| | subpass | ☆ | 001.wav | USER GROUP 1 |
| | subpass2 | RED CHARACTER | NONE | USER GROUP 2 |
| | subpass3 | ▲ | 002.wav | TIME LIMIT (24 HOURS) |
| user002 | aaaa | 🍎 | 003.wav | ADMINISTRATOR |
| | bbbb | ■ | NONE | USER GROUP 3 |
| | cccc | 🍌 | 001.wav | COUNT LIMIT (ONE) |
| ... | ... | ... | ... | ... | ized
INFORMATION PROCESSING APPARATUS AND INFORMATION PROCESSING METHOD

TECHNICAL FIELD

The present invention relates to an information processing apparatus and an information processing method.

BACKGROUND ART

Generally, in the operating systems of servers and clients, web services and the like, authentication processing is executed on the basis of one-to-one combinations of a user ID that is authentication ID (IDentification) and a password. If the authentication processing is successful, then the user acquires in a login state in which particular services are provided to the user. Meanwhile, each authentication ID is granted with a unique authority and the software that can be executed and services that can be provided may be restricted in accordance with the authentication ID.

In the techniques mentioned above, the authority that is provided by an individual authentication ID is of one type. For example, an authentication ID with which authentication processing is successful has administrator authority, then this authentication ID is granted with administrator authority. In addition, in login environment initialization processing to be executed when login is executed with the authentication ID with which authentication processing is successful, processing unique to that authentication ID is executed at the time of login.

SUMMARY

Technical Problem

The inventor in the present application has recognized the possibility that enhanced user convenience with an information processing apparatus can be realized if providing the information processing apparatus capable of granting two or more types of authorities to a single authentication ID and changing initialization processing.

Therefore, the present invention has been made with respect to the problem addressed above, one object thereof being the provision of a technique that grants two or more types of authorities to a single authentication ID.

Solution to Problem

In order to solve the above-mentioned problem and according to one aspect of the present invention, there is provided an information processing apparatus. This information processing apparatus has a password input block configured to accept a password for use in user authentication, an authentication block configured to execute user authentication on the basis of an authentication ID and a password accepted by the password input block, and a service provision block configured to provide a service to a user concerned if user authentication by the authentication block is successful. The service provision block provides a service corresponding to the password accepted by the password input block to the user.

In another aspect of the present invention, there is provided an information processing method. This method makes a processor perform a step of accepting a password, a step of executing user authentication on the basis of an authentication ID and the password, and a step of providing a service corresponding to each password to a user if user authentication is successful.

In still another aspect of the present invention, there is provided a computer program causing a computer to realize the steps of any one of the methods mentioned above.

This program may be provided as a part of firmware that is built in such devices in order to basically control hardware resources such as game machines. This firmware is stored in the ROM (Read Only Memory) or a semiconductor memory such a flash memory in the device, for example. In order to provide this firmware or update part of the firmware, a computer-readable recording medium storing this program may be provided or this program may be transmitted over communication lines.

It should be noted that any combinations of the components mentioned above and what is obtained by translating the expressions of the present invention between an apparatus, a system, a computer program, a data structure, and a recording medium are also valid as aspects of the present invention.

Advantageous Effect of Invention

According to the present invention, a technique that grants two or more types of authorities to a single authentication ID can be provided.

BRIEF DESCRIPTION OF DRAWINGS

FIGS. 1(a) through 1(c) are diagrams schematically illustrating one example of an information processing apparatus practiced as one embodiment.

FIGS. 3(a) through 3(d) are diagrams schematically illustrating examples of password registration screens that are provided by the information processing apparatus according to the present embodiment.

FIG. 5 is a diagram schematically illustrating another example of a setting screen for service provision authority that is displayed by the password registration block according to the present embodiment.

FIGS. 6(a) through 6(d) are diagrams schematically illustrating sub password change screens that are displayed by a password registration block according to the present embodiment.

FIG. 7 is a diagram schematically illustrating a data configuration of a user database according to one embodiment of the present invention.

DESCRIPTION OF EMBODIMENT

Figure 2:
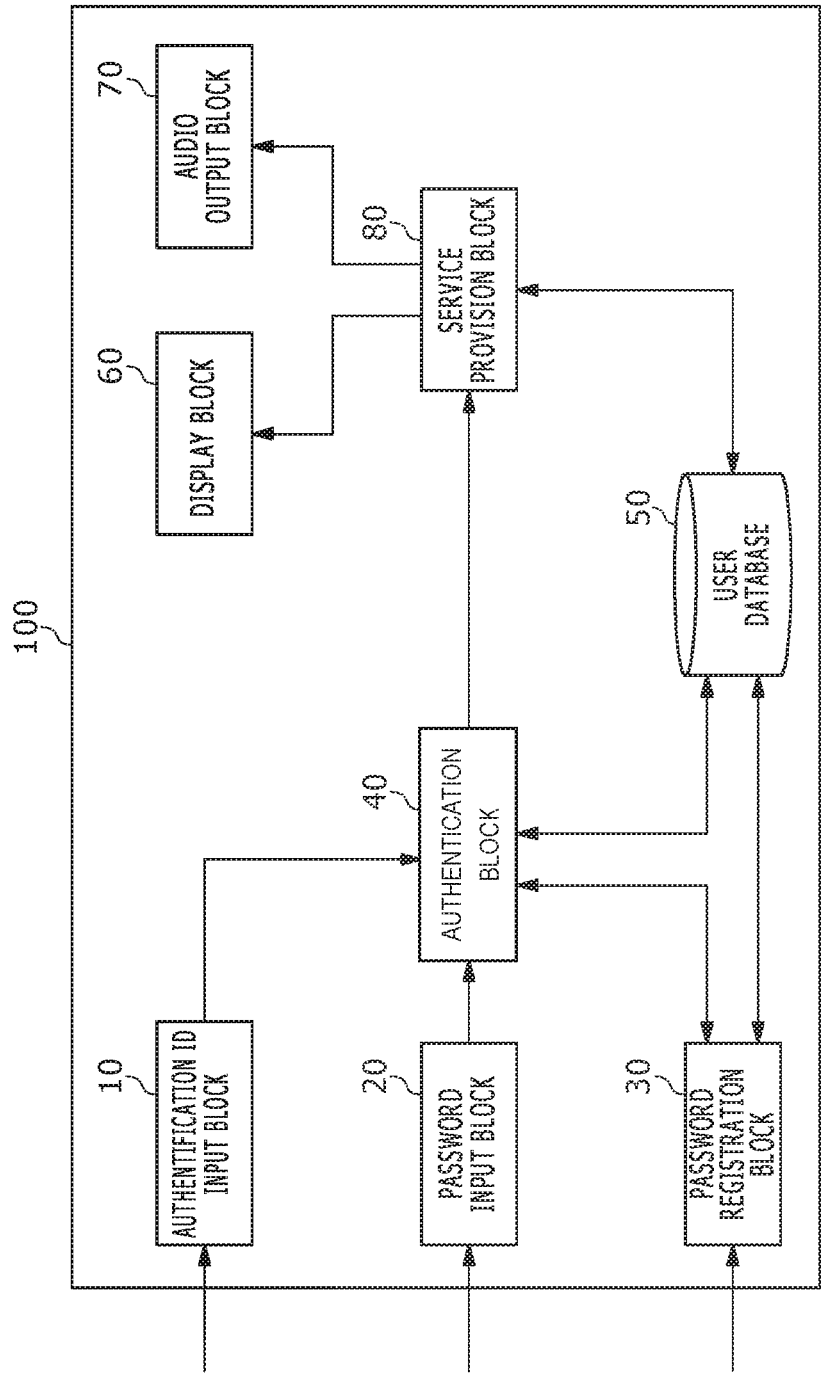
FIG. 2 is diagram schematically illustrating a functional configuration of the information processing apparatus according to the present embodiment.

The following describes an outline of one embodiment of the present invention. The information processing apparatus practiced as one embodiment of the present invention becomes operational when a user having an authentication ID executes user authentication by use of a password. It should be noted that the information processing apparatus according to one embodiment can link two or more passwords to one authentication ID, namely, provide 1:n (n being an integer of 2 or higher) of the correlation between authentication ID and password. Allocating different authorities or services to different passwords allows the information processing apparatus according to the present embodiment to provide different services to a user who logs in with the same authentication ID if a password for use in authentication is different from others. This setup enhances usability in various points such as the prevention of password leakage, the measures against theft and the enhancement of convenience in sharing the information processing apparatus with other users, for example.

Referring to FIGS. 1(a) through 1(c), there are schematically depicted examples of an information processing apparatus 100 according to one embodiment. The information processing apparatus 100 according to one embodiment is applicable to apparatuses in various fields. For example, the example of the information processing apparatus 100 depicted in FIG. 1(a) is an apparatus that is not supposed for usual transportation at the time of use like a PC (Personal Computer) and stationary game machines.

The example of the information processing apparatus 100 depicted in FIG. 1(b) is a portable game machine. The present invention is applicable to such apparatuses supposed to be portable with a user as a mobile phone, a smartphone, a tablet PC, a note-type PC, an electric dictionary, an electronic book terminal, a portable television, a portable music player and so on in addition to the portable game machine depicted in FIG. 1(b).

The example of the information processing apparatus 100 depicted in FIG. 1(c) is an automated teller machine (hereafter referred to as an ATM). With an ATM, an account number or a cash card is an "authentication ID" so to speak and the secret number thereof is equivalent to "password." In addition, the invention cited in the present application is applicable to such apparatuses for providing services to users through networks as a server for managing the settlement of credit cards, a server for managing network banks, a server in server-client type services, and a server for providing cloud services, for example. In the case of a server for managing credit card settlement, a card number is an "authentication ID" so to speak and the signature and PIN (Personal Identification Number) of each card owner are equivalent to "password."

In the present specification that follows, the information processing apparatus 100 is described mainly by use of an example of a PC or a stationary game machine as depicted in FIG. 1(a). However, the information processing apparatus 100 according to one embodiment of the present invention is not limited to a PC or a station game machine; it will be understood by those skilled in the art that this information processing apparatus is also applicable to such apparatuses supposed for use on a portable basis and apparatuses for providing services through networks, such as ATM, as depicted in FIGS. 1(b) and 1(c).

Referring to FIG. 2, there is schematically depicted a functional configuration of the information processing apparatus 100 according to one embodiment. The information processing apparatus 100 according to one embodiment has an authentication ID input block 10, a password input block 20, a password registration block 30, an authentication block 40, a user database 50, a display block 60, an audio output block 70, and a service provision block 80.

FIG. 2 depicts a functional configuration for realizing the information processing apparatus 100 according to one embodiment with other configurations omitted. As depicted in FIG. 2, elements described as functional blocks for executing a variety of processing can be each configured by a CPU (Central Processing Unit), a main memory, and other LSI (Large Scale Integration) of an information processing apparatus 100 in the hardware approach; in the software approach, these functions are realized by programs loaded from the main memory. Therefore, it will be understood by those skilled in the art that these functional blocks are realized in a variety of forms by the computational resource of the information processing apparatus 100 and therefore these hardware and software are not limited to any particular elements.

Further, if the information processing apparatus 100 according to the embodiment is realized by a server/client system or a cloud system, "computational resource of the information processing apparatus 100" is not limited to the computational resource of one information processing apparatus 100. In this case, the resources including the computational resources of two or more servers and the computational resources of server and client provide "computational resource of the information processing apparatus 100."

The information processing apparatus 100 accepts an authentication ID for identifying the user of the information processing apparatus 100. To be more specific, the authentication ID input block 10 acquires an authentication ID entered through a numeric key, a software keyboard or the like into a GUI (Graphical User Interface) for prompting entry of an authentication ID and outputs the entered authentication ID to the authentication block 40.

The password input block 20 accepts the input of the password from the user. Like the authentication ID input block 10, the password input block 20 acquires the password entered in the GUI that prompts password entry and outputs the obtained password to the authentication block 40.

The authentication block 40 executes user authentication on the basis of the authentication ID accepted by the authentication ID input block 10 and the password accepted by the password input block 20. Details being described later, the user database 50 stores the authentication IDs registered on the information processing apparatus 100 and the passwords corresponding to these authentication IDs by linking the authentication IDs and the passwords with each other. The authentication block 40 references the user database 50 to search the user database 50 for the authentication ID accepted by the authentication ID input block 10. If the obtained authentication ID is not found stored in the user database 50, the authentication block 40 determines an authentication failure.

It should be noted that the user database 50 may store a hash value of each password in place or in addition to the plain text of the password by linking the hash value with the authentication ID. In this case, the user database 50 manages so that the hash values of passwords do not conflict each other. The hash values of passwords can be generated by use of known hash functions such as SHA-2 (Secure Hash Algorithm-2) for example.

If the obtained authentication ID is stored in the user database 50, the authentication block 40 detects whether the obtained password matches the password linked with the authentication ID. If there is no match between the obtained password and the password linked with the authentication ID, then the authentication block 40 determines that this authentication is unsuccessful. If the obtained password is found matching the password linked with the authentication ID, then the authentication block 40 determines that this authentication is successful. If the user authentication is found successful by the authentication block 40, then the service provision block 80 provides services to the user of successful authentication. The display block 60 outputs image information provided by the service provision block 80 to a display device, not depicted, and the audio output block 70 outputs audio information provided by the service provision block 80 to a speaker or an earphone, not depicted.

Here, the services to be provided by the service provision block 80 to users include various forms depending upon the types of the information processing apparatus 100. For example, if the information processing apparatus 100 is a PC, a stationary game machine, or a portable game machine, then the services to be provided by the service provision block 80 include the management of files and folders of various types, the management of files of save data and so on, the management of users, the execution of Internet access and applications, and the provision of user-unique desktop environments. If the information processing apparatus 100 is a portable terminal, such a mobile phone, then the above-mentioned services also include audio communication, the use of GPS (Global Positioning System) and account settlement based on near-distance wireless communication techniques, for example. For example, if the information processing apparatus 100 has been lost or stolen, the service provision block 80 takes images around the information processing apparatus 100 by use of a camera, not depicted, or gives alert sound. If the information processing apparatus 100 is a server for managing ATMs or the settlement of credit cards or a server for managing network banking, then the above-mentioned services include money depositing, purchase procedures and the change of secret numbers, for example.

Generally, the above-mentioned services are changed in the contents to be provided to each successfully authenticated user. For example, if the information processing apparatus 100 is a PC, then the desktop environments to be provided are different for each user; in addition, particular operations are enabled or disabled depending upon user authorities. If the information processing apparatus 100 is an ATM, then the amount of refund money is changed depending upon depositors who are users.

In contrast, the service provision block 80 according to the present embodiment changes services to be provided to users for each password accepted by the password input block 20. To be more specific, when two or more passwords are linked with the authentication ID that has been successfully authenticated, even if the authentication has been successful with the same authentication ID, the service provision block 80 selects a service corresponding to the password accepted by the password input block 20 and provides the selected service to the user.

As described above, the information processing apparatus 100 manages by linking user access authority, user environment initialization processing or the like not with the authentication ID but with the password entered at the time of authentication. For example, assume that a certain user has been authenticated with a password assigned with administrator authority. In this case, this user can access all files and folders in the information processing apparatus 100. On the other hand, even if authentication is executed with the same authentication ID, user's authentication with a password granted only with normal user's authority allows access to only particular files and folders.

Alternatively, if a certain user executes authentication with a password for work, then the desktop environment, the background of the desktop for example, is set for work. On the other hand, if the user executes authentication with a password for personal use with the same place authentication ID, then the desktop background is changed to the background image for private use.

In another example, if a user enters a particular password in the password input block 20, a predetermined file can be automatically deleted. In still another example, if a user enters a particular password in the password input block 20, a predetermined application, such as an SNS (Social Networking Service) application, may be automatically activated after login. This saves the labor of application startup when the user logs in on the information processing apparatus 100 with a particular intention, such as posting to an SNS or browsing the information posted to an SNS.

In yet another example, if the information processing apparatus 100 is a smartphone and when a certain user unlocks the smartphone with the password for work, then the phone number list and the electronic mail address list for work are made available. On the other hand, in the case of a same smartphone, if a certain user unlocks this smartphone with the password for personal use, then the phone number list and the electronic mail address list are set to those for private use.

Referring to FIGS. 3(a) through 3(d), there are schematically depicted examples of password registration screens provided by the information processing apparatus 100 according to the present embodiment. FIG. 3(a) depicts an example of a GUI for prompting the user to enter the authentication ID and another GUI for prompting the user to enter a password. When the user enters the authentication ID and the password in a predetermined position and clicks "login" icon, each of the authentication ID input block 10 and the password input block 20 outputs the obtained authentication ID and the obtained password to the authentication block 40. It should be noted that, in FIG. 3(a), the authentication ID entered by the user is a character string "user001" and the password is another character string "mainpass." It should be again noted that the password entered by the user may be displayed by use of other symbols such as "*" for example instead of characters in order to prevent other parties from reading.

FIG. 3(b) schematically depicts a sub password registration screen provided by the password registration block 30 according to the present embodiment. As depicted in FIG. 3(b), the password registration block 30 displays a GUI for prompting the user to enter a new sub password to be linked with the authentication ID and, at the same time, also displays another GUI for prompting the user to enter a registered password already linked to the authentication ID. In the example depicted in FIG. 3(b), the GUI for prompting the user to enter the main password as the already registered password is displayed.

It should be noted here that "main password" denotes a password that grants the strongest authority to the authentication ID to which this password is linked at the time of login; this is a password granted with administrator authority so to speak. If the user is successful in authentication by use of the main password, then operations set as the administrator authority of the information processing apparatus 100 are permitted. On the other hand, "sub password" is a password for granting a limited authority to the authentication ID to which this password is linked at the time of login. If the user is successful in authentication by use of a sub password, then operations of the information processing apparatus 100 are permitted within the range of the authority permitted to that password. If there are two or more sub passwords, authorities of different strengths may be granted to different sub passwords.

The authentication block 40 executes user authentication with an already registered password accepted by the password registration block 30. If the user authentication by the authentication block 40 is successful, the password registration block 30 stores a sub password that is a new password into the user database 50 by linking the sub password to the authentication ID. In the example depicted in FIG. 3(b), a character string "subpass" is entered as a sub password and password "subpass" is linked to the authentication ID "user001."

Execution of authentication by the authentication block 40 by use of an already registered password ensures that a user who has entered a new sub password is the valid user of the authentication ID who is currently in a login state. This setup can prevent such a situation from occurring, in which, while the user of the information processing apparatus 100 for example is away from the information processing apparatus 100 in a login state, another user registers the sub password in an unauthoritative manner.

Further, in the case where a user is asked to enter the main password as an already registered password, it is ensured that this user knows the password granted with administrator authority. Consequently, an attempt of adding a sub password by a user who does not know the password granted with administrator authority can be excluded, thereby further enhancing the safety when the sub password is added.

FIG. 3(c) depicts another example of a GUI for prompting the user to enter the authentication ID and another GUI for prompting the user to enter a password. Like in the example depicted in FIG. 3(a), also in the example depicted in FIG. 3(c), the character string "user001" is entered as the authentication ID. On the other hand, unlike in the example depicted in FIG. 3(a), in the example depicted in FIG. 3(c), the character string "subpass" is entered as the password.

On the basis of the authentication ID "user001" and the password "subpass," the authentication block 40 references the user database 50 to execute user authentication. Since the authentication ID "user001" and the password "subpass" are linked with each other, the authentication block 40 determines successful authentication. However, because the password "subpass" is a sub password, the service provision block 80 provides services that are different from those provided when the user logs in with the main password.

FIG. 3(d) schematically depicts one example of a GUI for displaying services available when the user logs in with a sub password. In the example depicted in FIG. 3(d), if the user logs in with a sub password, new posting to an SNS is permitted, but the registration of the sub password is prohibited. In FIG. 3(d), a character string "sub password registration" is struck out with two lines indicating that the registration of the sub password is disabled. Methods of indicating the prohibition of a particular service is not limited to line strike-out; it is also practicable to use various other methods such as gray-out and non-display.

Figure 4:
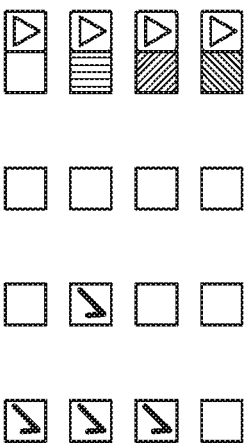
FIG. 4 is a diagram schematically illustrating one example of a setting screen for service provision authority that is displayed by a password registration block according to the present embodiment.

Referring to FIG. 4, there is depicted one example of a service provision authority setting screen that is displayed by the password registration block 30 according to the present embodiment. The authority setting screen is displayed by executing predetermined authority setting processing when the user logs in on the information processing apparatus 100 with the main password granted with administrator authority.

The example depicted in FIG. 4 indicates that four sub passwords "subpass," "subpass1," "subpass2," and "subpass3" are related to a certain authentication ID. The user who has logged in with the main password can set, for each sub password, items "new posting" for setting new posting to the SNS, "receive box" for setting access to the receive box of electronic mail, "sub password registration" for setting registration of sub password, and "background color" for setting a background color of desktop. In the example depicted in FIG. 4, the check boxes of "New Posting," "Receive Box," and "Sub Password Registration" are checked to set these service provision authorities. "Background Color" may be selected from the pulldown menu.

It should be noted that the settings of service provision authorities depicted in FIG. 4 are illustrative only; therefore, it is understood by those skilled in the art that this setting screen may be configured in various other forms so as to set various services such as on/off setting of login melody, selecting login melody, setting referable files and folders, for example.

Referring to FIG. 5, there is schematically depicted another example of a service provision authority setting screen that is displayed by the password registration block 30 according to the present embodiment. FIG. 5 depicts an example in which "Normal" and "Administrator" are prepared for the types of authorities. Unlike the example depicted in FIG. 4, the user who has logged in with the main password first sets "New Posting," "Receive Box," "Sub Password Registration," and "Background Color" for each authority type. Then, the user who have logged in with the main password sets "Normal" authority or "Administrator" authority for each sub password.

It should be noted that the authority types depicted in FIG. 5 are illustrative only; therefore, various other authorities such as guest account, account limited in login count, and time-limit account, for example. Further, user groups can be created as groups of users to whom particular authorities are granted. If, in the account limited with login count, the limit count is set to 1, then that password becomes a "disposable password" so to speak, namely, valid only once. This may be used when entering a password before people at a friend's house for example in which it is possible for the password to be exposed; even if the password is exposed, this setting can prevent the password from being used later by others.

As described above, in the information processing apparatus 100 according to the present embodiment, linking two or more different passwords to the same authentication ID allows the user to log in on the information processing apparatus 100 with different authorities even if the authentication ID is the same. Further, since desktop environments can be set without restriction for each password, changing desktop environments for each password allows the user to understand at a glance with which authority the user logs in on the information processing apparatus 100.

By contrast, a case is possible in which, from the viewpoint of security reinforcement, the user does not want to be known by others with which authority the user logs in on the information processing apparatus 100. In a specific example, if the information processing apparatus 100 is an ATM, the user has to draw money from the ATM before other people for some reason or other.

If the information processing apparatus 100 is an ATM, then user operations on the ATM are supposed that, depending upon the entry of a secret number for administrator (a parent for example) and the entry of a secret number of a general user (a child for example), deposit balances to be displayed and the upper limit of cash withdrawals be different between the parent and the child. However, it is not good to display on the ATM screen which of the secret numbers has been entered. On the other hand, if the person who has entered one of the passwords or a support staff of the information processing apparatus 100 cannot tell which of the secret numbers has been entered, a state of confusion may be caused.

The information processing apparatus 100 according to the present embodiment can change the on/off setting of sound notification at the time of successful authentication or change only background colors of the ATM screen in accordance with the passwords, thereby providing a login environment in which only the user is able to know the difference between the secret numbers, leaving the other persons disabled to know the difference.

As described above, the information processing apparatus 100 according to the present embodiment links two or more passwords to one authentication ID. Therefore, as compared with the conventional technique in which one password is linked to one authentication ID, uniqueness between the passwords must be secured. To be more specific, the password registration block 30 limits the registration of the same passwords as the already registered passwords, as new passwords.

In order to realize the above-mentioned concept, a method is proposed as one example that, if the user enters the same password as an already registered password when newly registering a password or changing already registered passwords, the password registration block 30 notifies the user that the password in question has already been registered. However, this method is undesirable in the viewpoint of security. In other words, assume that, while the authorized user is away from the information processing apparatus 100 in a login state, a malicious third party attempts the registration of a sub password without permission. If the user is notified that the password has already been registered, the third party acquires at least the knowledge that the password in question has already been registered and that password is a valid password.

Therefore, if the authentication block 40 authenticates the user at the time of sub password addition or change, the password registration block 30 according to the present embodiment uses the data with a new password entered by the user added with other items of information as the password to be linked with the authentication ID.

"Other items of information" to be attached by the password registration block 30 denote information that is added by the password registration block 30 independently of a user instruction so as to secure the uniqueness between the passwords. Other items of information may include a character string but not limited thereto. For example, other items of information may include symbols such as icons having particular patterns, a single color, or character font colors. For example, a character string "subpass" of which font color is red and another character string "subpass" of which font color is blue can be registered in the user database 50 as different passwords due to the different colors thereof.

Referring to FIGS. 6(a) through 6(d), there are schematically depicted examples of sub password change screens that are displayed by the password registration block 30 according to the present embodiment, thereby illustrating a method of preventing the leakage of already registered passwords to any third parties while securing the uniqueness between passwords.

FIG. 6(a) schematically depicts one example of a sub password change screen that is provided by the password registration block 30 according to the present embodiment. As depicted in FIG. 6(a), when the user changes passwords, the password registration block 30 displays a GUI for prompting the user to enter the current password and another GUI for prompting the user to enter a new password that takes the place of the current password. Further, in order to prevent the user from erroneously entering passwords, the password registration block 30 also displays still another GUI for prompting the user to reenter the new password that takes the place of the current password. If a match is not found between the new password that takes the place of the current password and the reentered password, the password registration block 30 discontinues the password change processing and notifies the user thereof.

It should be noted that FIG. 6(a) depicts the case in which the GUI for prompting the user to enter the current password. In addition, a GUI for prompting the user to enter a password granted with password change authority may be displayed. Consequently, that the user knows the password granted with password change authority can be secured, thereby enhancing security. Alternatively, a GUI for prompting the user to enter another password according to the current authentication ID may be displayed. Consequently, that the user knows two or more passwords linked to the current authentication ID can be secured, thereby enhancing security.

FIG. 6(b) depicts one example of a screen that is displayed by the password registration block 30 when a character string is added as another item of information. If a match is found between the new password entered by the user which takes the place of the current password and the reentered password, then, in order to secure the uniqueness between the passwords, the password registration block 30 uniquely attaches a character string "-abc" to the end of the password entered by the user to provide a new sub password. In addition to the character string "-abc," the password registration block 30 may add any other characters that can secure the uniqueness between passwords; preferably, however, these character strings are easy for the user to memorize and of appropriate lengths.

FIG. 6(c) depicts one example of a screen that is displayed by the password registration block 30 when symbols are added as other items of information. In the example depicted in FIG. 6(c), star symbols are added to "sub_pass" that are new passwords entered by the user. It should be noted that, though the user can selects symbols other than star from the pulldown menu, the symbols displayed in the pulldown menu are uniquely selected by the password registration block 30 so as to secure the uniqueness between passwords. For example, if a password with a star symbol added to "sub_pass" has already been registered, the password registration block 30 excludes the start symbol from the symbols displayed in the pulldown menu. Consequently, the uniqueness between the passwords can be secured. It should be noted that, even if a password added with a star symbol to "sub_pass" has not yet been registered, the password registration block 30 may exclude the star symbol from the pulldown menu for the reason of security.

FIG. 6(d) depicts one example of screen that is displayed by the password registration block 30 if a character color is added as other items of information. After entering "sub_pass" that is a new password, the user selects the character color of this password from the pulldown menu. Like the example depicted in FIG. 6(c), the symbols displayed in the pulldown menu are character colors uniquely selected by the password registration block 30 so as to secure the uniqueness between passwords. Securing the uniqueness between passwords by use of character colors makes it unnecessary for the user to memorize charactering strings and symbols other than the character colors entered by the user, thereby facilitating for the user to memorize passwords.

Referring to FIG. 7, there is schematically depicted a data configuration of the user database 50 according to the present embodiment. Each user who has registered as a user in the information processing apparatus 100 is allocated with a unique authentication ID. With the user database 50 depicted in FIG. 7, two authentication IDs "user001" and "user002" are depicted by way of example.

As depicted in FIG. 7, the user database 50 stores authentication IDs and passwords by linking two or more passwords to one authentication ID. For example, in FIG. 7, four base passwords "mainpass," "subpass," "subpass2," and "subpass3" are linked to authentication ID "user001." Three base passwords "aaaa," "bbbb," and "cccc" are linked to authentication ID "user002." Here, "base password" denotes a password entered by the user to which the password registration block 30 adds additional information.

In the user database 50, additional information to be added to each base password is also stored. For example, the character string "-abc" is registered in base password "mainpass" of authentication ID "user001" as the additional information. This indicates that one of the passwords linked to authentication ID "user001" is "mainpass-abc." The user database 50 depicted in FIG. 7 further indicates that password "mainpass-abc" of authentication ID "user001" is a password granted with administrator authority and is set such that no sound is given at the time of login after successful authentication. It should be noted that, though not depicted in FIG. 7, the user database 50 also stores such desktop environment setting information for each password as desktop background colors and so on after login.

One example of the desktop environment setting information is the setting of so-called "white list" that specifies files and folders that are accessible when login is executed with a certain sub password. Alternatively, so-called "black list" may be set that specifies files and folders that are inaccessible when login is executed with a certain sub password.

FIG. 7 also depicts that a password with base password "aaaa" combined with an apple figure is granted with the administrator authority and an audio file named "003.wav" is reproduced at the time of login in the authentication ID "user002." If the authentication block 40 is successful in user authentication, the service provision block 80 makes the audio output block output audio signals different from password to password. As described above, the user can set whether or not to reproduce audio at the time of login with a password granted with the administrator authority, so that any third parties are disabled to infer the authority only by presence or absence of audio reproduction at the time of login.

In addition, the service provision block 80 selects a background image corresponding to each password accepted by the password input block 20 on the basis of the desktop environment setting information stored in the user database 50. The display block 60 displays the selected background image as a desktop background image. A background image can be set by the user without restriction, so that any third parties cannot infer the authority with which the user logs in only by seeing the desktop image.

As described above, the additional information to be added to a base password is not limited to character strings and figures such as apple and banana; the additional information also includes symbols such as triangle and square and character colors. Further, each password is granted with authority or a service. Therefore, if login passwords are different, the user receives different service contents from the information processing apparatus 100.

On the other hand, if, while the user logs in on the information processing apparatus 100 by use of a certain password and the user can execute authority or a service temporarily given to another password, execution of logout or re-login by use of another password can be omitted, thereby saving user labor. Therefore, the information processing apparatus 100 according to the present embodiment provides a mechanism for temporarily changing from the authority of one password to the authority of another password. Consequently, the user can temporarily upgrade the authority from a sub password with limited authority to the main password granted with administrator authority without executing logout and re-login operations. The following describes this mechanism in detail.

Figure 8:
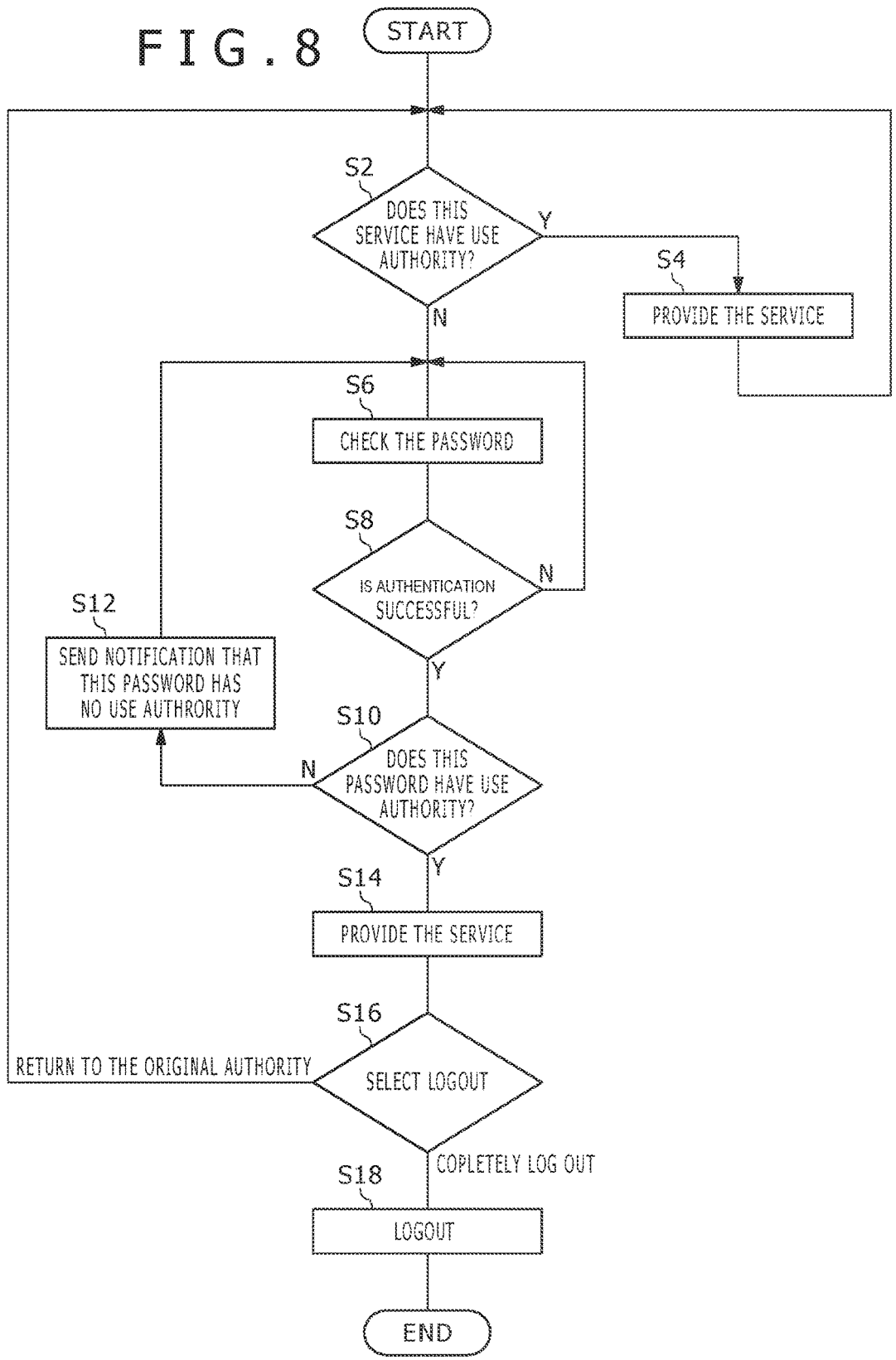
FIG. 8 is a flowchart indicative of a flow of authority upgrade processing that is executed by the information processing apparatus according to the embodiment.

Referring to FIG. 8, there is depicted a flowchart indicative of a flow of authority upgrade processing that is executed by the information processing apparatus 100 according to the present embodiment. The processing in this flowchart starts when the user logged in the information processing apparatus 100 is about to receive the provision of a particular service.

If a service selected by the user is one for which the password used for authentication has use authority (Y of S2), then the service provision block 80 provides this service to the user (S4). It should be noted that the service provision block 80 can determine whether or not the service selected by the user is a service for which the password used for authentication has the use authority by referencing the user database 50 by use of a password obtained from the authentication block 40.

If the service selected by the user is not a service for which the password used for authentication has the use authority (N of S2), then the password input block 20 displays a GUI for prompting the user to enter a new password, acquiring the password from the user. The authentication block 40 executes authentication processing by making sure that the newly entered password has been stored in the user database 50 by linking to the authentication ID with which the login is executed currently (S6).

If the authentication fails (N of S8), then the processing returns to step S6, prompting the user to enter a new password again. If the authentication is successful (Y of S8), then the service provision block 80 determines whether or not the password used for authentication is one that has the use authority of the service selected by the user. If the password is found to have no use authority (N of 10), then the service provision block 80 notifies the user that this password has no use authority (S12). When the notification that this password has no use authority is given to the user by the service provision block 80, the processing returns to step S6 to prompt the user to enter a new password again.

If the password has the use authority of the service selected by the user (Y of S10), then the service provision block 80 provides the service to the user (S14). Receiving the service provision, the user selects a type of logout. It should be noted that "type of logout" is a scheme of logout selectable by the user who temporarily has executed password authority change; this scheme includes the return to the authority granted to the original password and the complete logout from the information processing apparatus 100.

If the user selects the return to the original authority ("return to the original authority" of S16), the temporary authority change is terminated, upon which the procedure returns to step S2. In this case, the state in which the user is logging in the information processing apparatus 100 is maintained. If the user selects complete logout ("completely log out" of S16), then the user logs out of the information processing apparatus 100 (S18). When the user logs out of the information processing apparatus 100, the processing in the present flowchart is terminated.

As described above, if the user attempts to acquire the provision of a service that cannot be executed by the password with which the user is currently logged in, the password input block 20 prompts the user to enter a password granted with the authority provided by that service. When the user enters a proper password, the user can acquire the provision of that service without executing logoff and re-login operations. Consequently, the user can temporarily change the authorities only by newly entering a password without entering the same authentication ID. In addition, the authority change is required no more, the user can return to the original authority without executing the logout and re-login operations.

Figure 9:
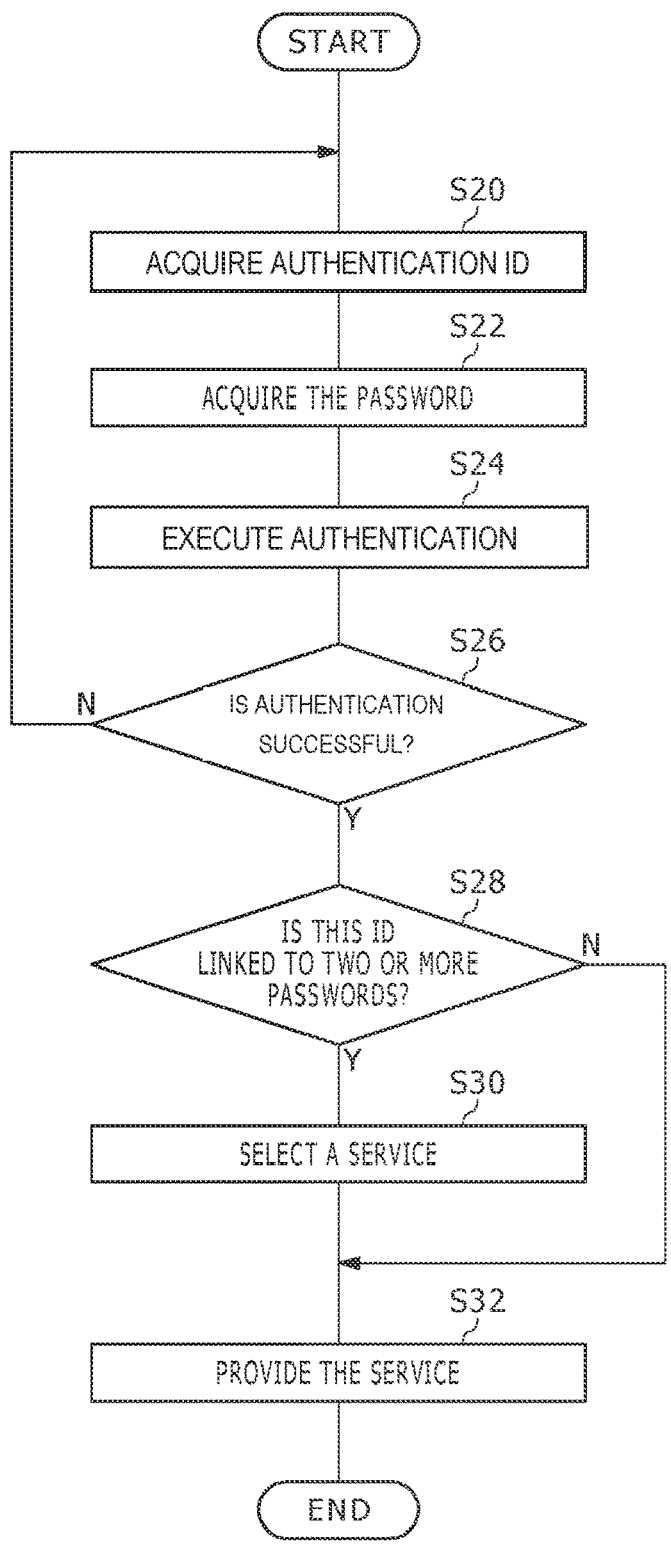
FIG. 9 is a flowchart indicative of a flow of service provision processing that is executed by the information processing apparatus according to the present embodiment.

Referring to FIG. 9, there is a flowchart indicative of a flow of service provision processing that is executed by the information processing apparatus 100 according to the present embodiment. The processing in the present flowchart is started when the user logs in on the information processing apparatus 100.

The authentication ID input block 10 acquires an authentication ID for identifying the user (S20). The password input block 20 acquires a password entered by the user (S22). The authentication block 40 references the user database 50 to execute user authentication on the basis of the authentication ID obtained by the authentication ID input block 10 and the password obtained by the password input block 20 (S24).

If the user authentication fails (N of S26), then the procedure returns to step S20 to repeat the user authentication processing. If the user authentication is successful (Y of S26), then the service provision block 80 references the user database 50 to determine whether or not two or more passwords are linked to the authentication ID. If two or more passwords are linked to the authentication ID (Y of S28), then the service provision block 80 selects a service to be provided to the user in accordance with the entered password (S30) and provides the service to the user (S32). If two or more passwords are not linked to the authentication ID (N of S28), then the service provision block 80 provides a predetermined service without service selection. When the service provision block 80 provides the service to the user, the processing in the present flowchart is terminated.

Thus, according to the information processing apparatus 100 according to the present embodiment, a technique in which authorities of two or more types are granted to a single authentication ID can be provided.

As described above, the present invention has been described on the basis of embodiments. It will be understood by those skilled in the art that the embodiments are illustrative only and therefore there may be a variety of modifications based on the combinations of configurational elements and processing processes of the embodiments.

Modifications:

In the descriptions explained above, passwords that the password input block 20 accepts are mainly of character strings and symbols which are used for the user authentication. It should be noted here that the passwords that the password input block 20 accepts are not limited to character strings and symbols; the passwords may be certain patterns. For example, assume that the information processing apparatus 100 is a smartphone or a PC and the present invention is applied in order to unlock the information processing apparatus 100. In this case, the information processing apparatus 100 has a touch panel to accept inputs caused by a user finger or a stylus pen. When the user traces the touch panel, a resultant locus provides a "pattern."

The user enters a certain pattern into the touch panel of the information processing apparatus 100. The user database 50 stores patterns in advance and the authentication block 40 compares the pattern entered by the user with each pattern stored in the user database 50. If a match or a substantial match between the patterns is found as a result of the comparison, the authentication block 40 determines successful authentication. It should be noted that the information processing apparatus 100 may display one or more landmarks on the touch panel. In this case, the password input block 20 may use a sequence in which user inputs pass that landmark as the "pattern."

In the case mentioned above, the user does not enter the authentication ID in the information processing apparatus 100 and therefore the step in which the authentication ID input block 10 accepts the authentication ID from the user is omitted. Generally, in the case where one user carries an apparatus always close to his or her person as with a smartphone, that smartphone is generally used by a single user. In this case, it can be understood that having the information processing apparatus 100 itself is equivalent to the "user knows the authentication ID." In other words, in the case of unlocking a smartphone, it can be understood that, when the user enters a pattern, an authentication ID has already been determined. Therefore, the authentication block 40 may only execute authentication processing on the basis of patterns stored in the user database 50 and the pattern entered by the user.

Further, in accordance with a pattern entered by the user through the touch panel of the information processing apparatus 100, the user may change applications that are automatically activated after unlocking the information processing apparatus 100. For example, when the information processing apparatus 100 is locked, icons corresponding to one or more applications to be automatically activated may be displayed on the touch panel in a distributed manner. When the end of the pattern entered by the user through the touch panel overlaps any of the icons, the information processing apparatus 100 may be unlocked and, at the same time, the application corresponding to an icon located at the end of the pattern may be automatically executed.

Use scenes of the information processing apparatus 100 according to the embodiments and variations of the present invention described above may be of a variety forms.

With today's information processing systems, it is a general practice that authentication processing is executed on the basis of the one-to-one combination of authentication IDs and passwords. For this reason, transferring part of the user environmental information of a certain user to another user may be executed by methods in which the disclosing party transfers authentication information to the browsing party before the death of the disclosing party by means of a will by trusting the browsing party or a predetermined temporal threshold (no access to a service for three weeks for example) and an action (mailing password information to a predetermined e-mail address) may be set. However, these methods involve the following problems. In other words, problems in which there is no assurance for the browsing party to keep the promise and there is a possibility that all information be exposed to other persons before the death of the user. In addition, because the death may come any time, it is difficult to determine until when the information (personal diaries and so on) to be deleted in the future is held.

Further, if, for the reason of a long-term tour or quitting using service for example, a predetermined temporal threshold is unintentionally exceeded, the mail is unintentionally transmitted. On the other hand, if a predetermined temporal threshold is set to a long value, the lead time of accessing information is elongated. In addition, if a long time passes (30 years for example) from taking an action of mail transmission, it is possible that the mail address concerned exists no more.

In addition, it is practicable today that a super user (a root user or an administrator, for example) having authority stronger than the own user accesses the user environment; however, it is a problem that there is no means of giving access to part of information for a user having an authority more limited than that of the own user. In regards to this, it may be one of the means that another user account (an account shared by a family for example) is created and only the contents to be regularly kept is copied such that this content can be accessed with that user account. However, this method disperses the user environment into two or more pieces, thereby taking time and labor for content management.

Further, in today's systems in which authentication IDs and passwords are managed on a one-to-one combination basis, letting other persons know authentication ID and password combinations denotes that these other persons can access all of own information and authorities. Normally, the authentication ID and the password are exclusive to oneself. In today's information-oriented society, there occur situations in which these authentication ID and password may be transferred to others against one's own intention such as will for example or one's own intention (when one is subdued by robbery for example).

In the former case, it is possible that, after transferring the authentication ID and the password to others, all information and authorities be accessed earlier than intended. Expecting such a possibility, the information to be kept may be arranged beforehand like deleting personal diaries and mail for example; however, it is undesirable because information activity is sacrificed at the time of transferring the authentication ID and the password combination to others.

In the latter case, authentication failure at an ATM or the like would possibly lead to user's exposure to dangers. Therefore, that the user must prove in front of an offender that the information is the information providing successful authentication. However, this is undesirable because all information and authorities are sacrificed at the same time. In order to circumvent the above-mentioned problems, a possible solution approach is that another ID for disclosure to others is newly created and only the information disclosable to others is transferred. However, in both of the former and latter cases, it takes time and labor to copy information every time such a situation occurs and there remains awkwardness why there are two authentication IDs (namely, what is the password of the other authentication ID) to begin with.

According to the information processing apparatus 100 according to the embodiments and variations of the present invention, techniques can be provided allowing authentication IDs look one, the authentication succeeds, information accessible by others is limited only part thereof, and the user concerned can subsequently fully access all information.

The following describes a variety of scenes of use of the present invention.

The First Use Scene:

In the case of electronic devices of personal use as the information processing apparatus 100 depicted in FIGS. 1(a) and 1(b), a variety of services can be linked to different sub passwords. Suppose that a sub password for the use by family members other than the user concerned is set, or only the information like a will to be disclosed by the family members other than the user concerned is set, for example. This allows the disclosure of only the information to be kept while hiding the information not to be seen by the others, such as diaries of the user concerned.

The Second Use Scene:

If the portable electronic device depicted in FIG. 1(b) or the ATM as the information processing apparatus 100, a "trap password" can be set against theft. To be more specific, to one of the sub passwords to be linked to the authentication ID, a password that can be guessed by the third party is purposely set. For example, the user's birthday, phone number, or postal code is set as a sub password; if login is executed with this password, the user's mobile phone or a security company is automatically notified thereof or GPS information is automatically disclosed. Consequently, if the information processing apparatus 100 or a cash card is stolen and used by the third party just in case, the user can promptly acquires the information thereof. Especially, if the information processing apparatus 100 is smartphone having a camera and GPS and the login is executed with a trap password, then the face of the owner may be imaged and the GPS function is turned on, thereby transmitting the face image and GPS information to a particular server.

The Third Use Scene:

If an ATM is supposed as the information processing apparatus 100, assume that it becomes necessary for the user to operate the ATM in front of others for some reason. Then, a sub password for taking measures against such a situation can be set in advance. For example, entering a predetermined number as an ATM secret number allows automatic contact with a security company or bank staff and setting the display of account balance below a certain amount, thereby enhancing security.

The Fourth Use Scene:

In the case of the electronic devices for personal use as the information processing apparatus 100 depicted in FIGS. 1(a) and 1(b), a sub password for child use can also be set. Login with a sub password for child use allows the use as parental control so to speak such as disability of execution of predetermined programs and restriction on network access, for example. Further, if an ATM is supposed as the information processing apparatus 100, a secret number of child can be set. When a secret number of child is entered, control can be set such that an ATM withdrawable amount is restricted and the upper limit is set to the displayed balance. In addition, in the entry in bankbook, the balance is entered in a range usable by child and transactions done with the password for child use are recorded.

The Fifth Use Scene:

In the case of the electronic devices for personal use as the information processing apparatus 100 depicted in FIGS. 1(a) and 1(b), forgetting to have logged out can be prevented. To be more specific, if login has been executed with a predetermined sub password, then the setting can be provided in which logout is automatically executed when a preset length of time has passed.

The Sixth Use Scene:

Linking two or more passwords to one authentication ID can provide main password initialization processing. For example, if a main password having administrator authority is forgotten or changed by a third party, thereby disabling the use of the main password, then setting can be done that entering all the other passwords initializes the unusable main password. Therefore, even if the main password is unusable, the user who knows all sub passwords may be a rightful user with high possibility, thereby ensuring security if the main password is initialized.

The Seventh Use Scene:

If a smartphone, a note PC, or an ATM having biometric authentication system such as finger print authentication or vein authentication is assumed as the information processing apparatus 100, the authentication operations by the right hand or the left hand may offer different services to be provided. For example, in the case of a smartphone or a note PC, setting may be made that executing authentication with a right-hand finger causes normal unlocking and executing authentication with a left-hand finger causes smartphone initialization.

The Eighth Use Scene:

In the case of a server that executes credit card settlement as the information processing apparatus 100, a PIN for child and a PIN for parent may provide different amounts of settlement. For example, if a PIN for parent is entered, normal settlement can be executed; however, if a PIN for child is entered, a monthly usable amount may be restricted.

REFERENCE SIGNS LIST

10 . . . Authentication ID input block, 20 . . . Password input block, 30 . . . Password registration block, 40 . . . Authentication block, 50 . . . User database, 60 . . . Display block, 70 . . . Audio output block, 80 . . . Service provision block, 100 . . . Information processing apparatus

INDUSTRIAL APPLICABILITY

The present invention is applicable to a technique for granting authorities of two or more types to a single authentication ID.

The invention claimed is:

1. An information processing apparatus comprising:
a processor;
an input device;
a display;
a password input block configured to accept, from a user using the input device, an already registered password for use in user authentication;
an authentication block configured to execute user authentication on the basis of an authentication identification and the already registered password accepted by the password input block;
a service provision block configured to provide a first service to the user on the display if user authentication by the authentication block is successful,
wherein the service provision block provides the first service corresponding to the already registered password accepted by the password input block to the user; and
a password registration block configured to accept, if the user has already been authenticated using the already registered password, input of a new password to be linked to the authentication identification,
wherein the new password and the already registered password are both stored in association with the authentication identification,
wherein, if the user provides the authentication identification and the new password, the user is provided a second service,
wherein the first service and the second service comprise at least one authority that overlaps,
wherein the second service has less authorities than the first service,
wherein a first background image displayed to the user when using the first service is different than a second background image displayed to the user when using the second service,
wherein the first background image is registered in association with the already registered password, and
wherein the second background image is registered in association with the new password.

2. The information processing apparatus according to claim 1,
wherein, if the authentication block authenticates the user, the password registration block automatically selects an additional item to the new password and stores the additional item in conjunction with the new password,
wherein authentication of the new password by the authentication block further requires the user to provide the additional item to be provided the second service.

3. The information processing apparatus according to claim 2,
wherein the additional information is a graphic symbol or a character color symbol.

4. The information processing apparatus according to claim 1, further comprising:
an audio output block configured to output audio,
wherein, if user authentication by the authentication block is successful, the service provision block makes the audio output block output first audio corresponding to the already registered password or second audio different than the first audio, wherein the second audio corresponds to the new password accepted by the password input block.

5. An information processing method comprising:
accepting input of an already registered password and an authentication identification from a user;
providing a first service to the user if the already registered password is authenticated by an information processing apparatus,
accepting registration of a new password if the user has been authenticated using the already registered password;
storing the authentication identification in association with both the already registered password and the new password in a user database; and
providing a second service to the user if the user provides the authentication information and the new password if user authentication is successful,
wherein the first service and the second services comprise at least one authority that overlaps,
wherein the second service has less authorities than the first service,
wherein a first background image displayed to the user when using the first service is different than a second background image displayed to the user when using the second service,
wherein the first background image is registered in association with the already registered password, and wherein the second background image is registered in association with the new password.

6. A non-transitory computer-readable recording medium storing a program for a computer having a processor, the program causing the processor to execute the steps of:
- accepting input of an already registered password and an authentication identification from a user;
- providing a first service to the user if the already registered password is authenticated by an information processing apparatus,
- accepting registration of a new password if the user has been authenticated using the already registered password;
- storing the authentication identification in association with both the already registered password and the new password in a user database; and
- providing a second service to the user if the user provides the authentication information and the new password if user authentication is successful,
- wherein the first service and the second services comprise at least one authority that overlaps,
- wherein the second service has less authorities than the first service,
- wherein a first background image displayed to the user when using the first service is different than a second background image displayed to the user when using the second service,
- wherein the first background image is registered in association with the already registered password, and
- wherein the second background image is registered in association with the new password.

* * * * *